United States Patent [19]

Hosoda et al.

[11] Patent Number: 4,709,342
[45] Date of Patent: Nov. 24, 1987

[54] TACTILE SENSING APPARATUS

[75] Inventors: Yuji Hosoda; Kazuo Honma; Masakatsu Fujie; Taro Iwamoto; Kohji Kamejima, all of Ibaraki; Yoshiyuki Nakano, Hitachi, all of Japan

[73] Assignee: Hitachi, Ltd., Tokyo, Japan

[21] Appl. No.: 636,296

[22] Filed: Jul. 31, 1984

[30] Foreign Application Priority Data

Aug. 3, 1983 [JP] Japan ................................ 58-141030

[51] Int. Cl.[4] .................... G01D 7/02; G01D 5/14; G01L 5/16
[52] U.S. Cl. .................................... 364/558; 364/556; 73/862.04; 310/338; 901/46; 901/33
[58] Field of Search ............................. 364/558, 556; 340/365 A, 365 S; 901/33, 44, 46, 30, 31, 32, 34, 47; 178/18; 73/862.04; 310/338

[56] References Cited

U.S. PATENT DOCUMENTS

| | | | |
|---|---|---|---|
| 3,904,234 | 9/1975 | Hill et al. | 901/32 |
| 4,020,686 | 5/1977 | Brendel | 73/862.04 |
| 4,192,005 | 3/1980 | Kurtz | 364/571 |
| 4,226,125 | 10/1980 | Waugh | 73/708 |
| 4,292,673 | 9/1981 | DuBae | 364/509 |
| 4,296,406 | 11/1981 | Pearson | 340/166 R |
| 4,328,441 | 5/1982 | Kroeger, Jr. et al. | 310/319 |
| 4,389,711 | 6/1983 | Hotta et al. | 73/862.04 |
| 4,399,515 | 8/1983 | Gross | 364/571 |
| 4,415,781 | 11/1983 | Frame et al. | 200/5 A |
| 4,428,225 | 1/1984 | Kato et al. | 73/862.04 |
| 4,539,554 | 9/1985 | Jarns et al. | 340/365 A |
| 4,554,530 | 11/1985 | Mussmann | 340/365 S |
| 4,588,348 | 5/1986 | Beni et al. | 901/46 |
| 4,605,354 | 8/1986 | Daly | 901/33 |

OTHER PUBLICATIONS

Raibert et al., "Design and Implementation of a VLSI Tactile Sensing Computer", The International Journal of Robotics Research, vol. 1, No. 3, Fall 1982.
Angell et al., "Microprocessors Get Integrated Sensors", IEEE Spectrum, Feb. 1980, pp. 42–46.
Hackwood et al., Proc. of the 3rd International Conf. on Robot Vision and Sensory Controls, Nov. 1983, pp. 363–369.
Warnecke et al., Industrial Robots: Application Experience, 1982, I.F.S. (Publications) Ltd., U.K., pp. 257–267.
"Simple Solutions Trace Complex Surfaces", Sensor Review, Apr. 1983, pp. 81–83.
Rebman et al., "A Tactile Sensor with Electrooptical Transduction", Proceedings of the 3rd International Conference on Robot Vision and Sensory Controls, Nov. 6–10, 1983, pp. 341–347.
Robillard, Microprocessor Based Robotics, vol. I, 1983, Howard W. Sams & Co., pp. 71, 72.

Primary Examiner—Errol A. Krass
Assistant Examiner—Daniel W. Juffernbruch
Attorney, Agent, or Firm—Antonelli, Terry & Wands

[57] ABSTRACT

Tactileسensing apparatus for detecting a tactile sense with an object to-be-handled, comprising a plurality of pressure sensing devices, a processor which processes outputs of the pressure sensing devices, and a touch device which contacts with the respective pressure sensing devices in common, whereby information items on a pressure sense, a viscosity sense and a slip sense are simultaneously detected with the outputs of the pressure sensing devices which vary depending upon a direction and a magnitude of a force acting on the touch device.

12 Claims, 26 Drawing Figures

TACTILE SENSING APPARATUS

BACKGROUND OF THE INVENTION

The present invention relates to tactile sensing apparatus, and more particularly to such apparatus well suited for detecting the finger sense of a high-function manipulator in an assembly robot or the like.

Heretofore, sensing means for detecting the finger senses of manipulators have principally been such that a surface for gripping an object to-be-handled is furnished with switching means such as a limit switch, conductive elastics or a strain gage, to confirm the presence or absence of the grip of the object through the switching means. An example of the sensing means has been reported in 'The International Journal of Robotics Research (1982, Vol. 1 No. 3)', "Design and Implementation of a VLSI Tactile Sensing Computer" by Raibert and Tanner. As special sensing means, one utilizing a fluid pressure has also been proposed. As stated before, the sensing means of this type detect whether or not the objects are firmly gripped.

On the other hand, a high function is required of manipulators in recent years. This necessitates as sensing means for detecting the finger sense, one which corresponds to the finger of man, namely, one which can obtain the complex sense of pressure sense, viscosity sense, slip sense, etc.

SUMMARY OF THE INVENTION

An object of the present invention is to provide tactile sensing means capable of detecting the complex sense of pressure sense, viscosity sense and slip sense.

The present invention consists in tactile sensing means for detecting tactile sense with an object to-be-handled, comprising a plurality of pressure sensing devices, a processor which processes outputs of the pressure sensing devices, and a touch device which touches the respective pressure sensing devices in common, whereby information items on pressure sense, viscosity sense and slip sense are simultaneously detected with the outputs of the pressure sensing devices which vary depending upon the direction and magnitude of a force acting on the touch device.

Other objects, advantages and features of the present invention will become apparent from embodiments to be described below.

DETAILED DESCRIPTION OF THE PREFERRED EMBODIMENTS

Now, embodiments of the present invention will be described with reference to the drawings.

Figure 1:
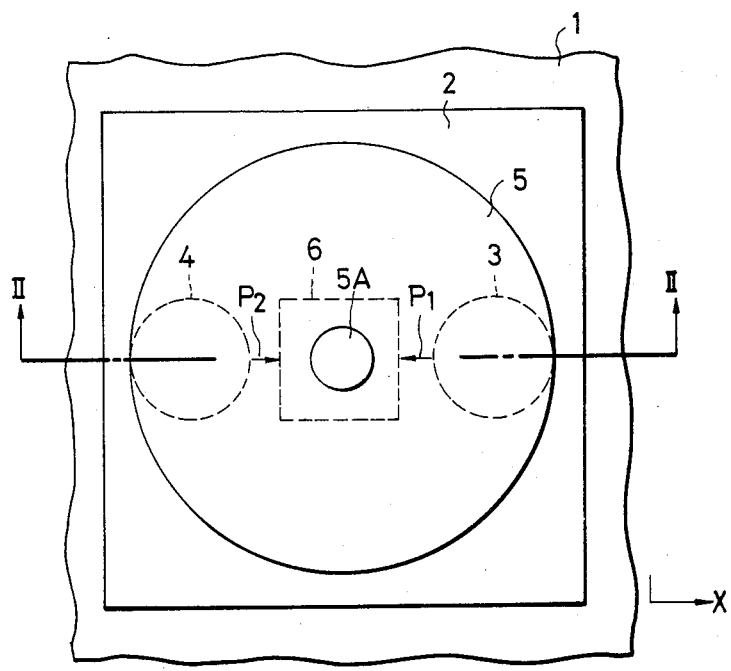
FIG. 1 is a plan view of an embodiment of sensing means according to the present invention.
Figure 2:
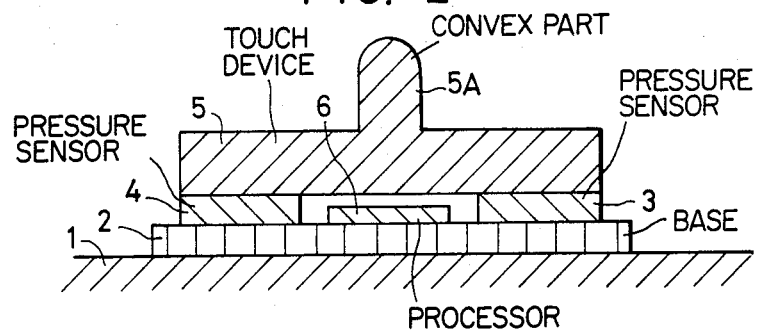
FIG. 2 is a sectional view taken and seen as indicated by arrows II—II in FIG. 1.

FIGS. 1 and 2 show one embodiment of sensing means according to the present invention. In these figures, a detection portion is so constructed that pressure sensing devices 3 and 4 such as piezo pressure sensing devices or pressure sensing semiconductor devices are disposed on a base 2 installed on a foundation 1, so as to be arrayed in an X direction, and that a touch device 5 which has a convex part 5A on its surface not lying in contact with the pressure sensing devices 3, 4 is arranged on these pressure sensing devices 3, 4. The pressure sensing devices 3 and 4 are connected to a processor 6 arranged on the base 2, and supply the processor 6 with signals $P_1$ and $P_2$ proportional to pressures applied thereto.

Owing to the above construction, when a force in the vertical direction acts on the convex part 5A, a uniform pressure is applied to the pressure sensing devices 3 and 4, and the signals $P_1$ and $P_2$ of equal values are delivered to the processor 6. In addition, when a force in the X direction acts on the convex part 5A, a nonuniform pressure is applied to the pressure sensing devices 3 and 4, and a difference develops between the signal $P_1$ and the signal $P_2$.

Figure 3:
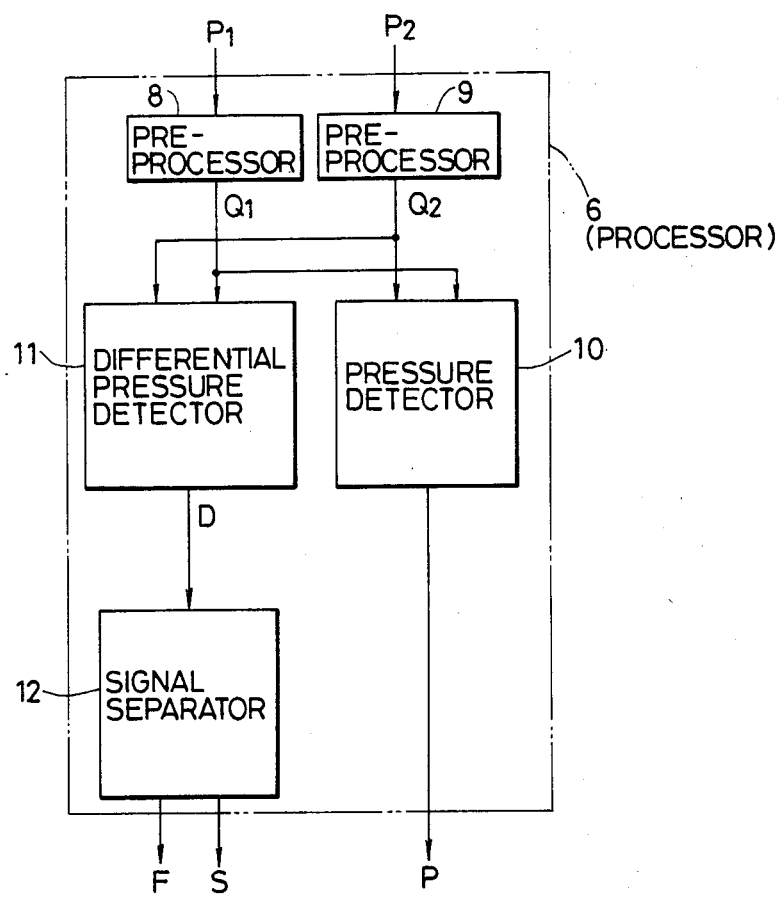
FIG. 3 is a diagram of a processor which is used in the embodiment shown in FIG. 1.

The arrangement of the aforementioned processor 6 will be described with reference to FIG. 3. This processor 6 comprises pre-processors 8, 9, a pressure detector 10, a differential pressure detector 11 and a signal separator 12. The respective pre-processors 8 and 9 convert the signals $P_1$ and $P_2$ produced by the detection portion, into signals $Q_1$ and $Q_2$ proportional thereto. The pressure detector 10 calculates the average value of the signals $Q_1$ and $Q_2$, and provides it as an output signal P. The differential pressure detector 11 calculates and provides a signal D based on the difference of the signals $Q_1$ and $Q_2$. The signal separator 12 provides a viscosity signal S which is proportional to the magnitude of the D.C. component or low frequency component of the signal D, and also a slip signal F which is proportional to the magnitude of the A.C. component or high frequency component of the signal D.

Next, examples of arrangements of the constituent circuits of the processor 6 will be described with reference to FIGS. 4 to 6.

Figure 4:
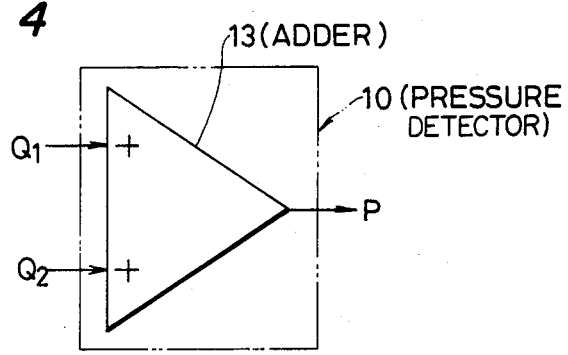
FIG. 4 is a diagram showing the arrangement of a pressure detector which constitutes the processor shown in FIG. 3.

FIG. 4 shows the example of arrangement of the pressure detector 10. This circuit 10 is composed of an adder 13, and delivers the pressure signal proportional to the sum of the signals $Q_1$ and $Q_2$.

Figure 5:
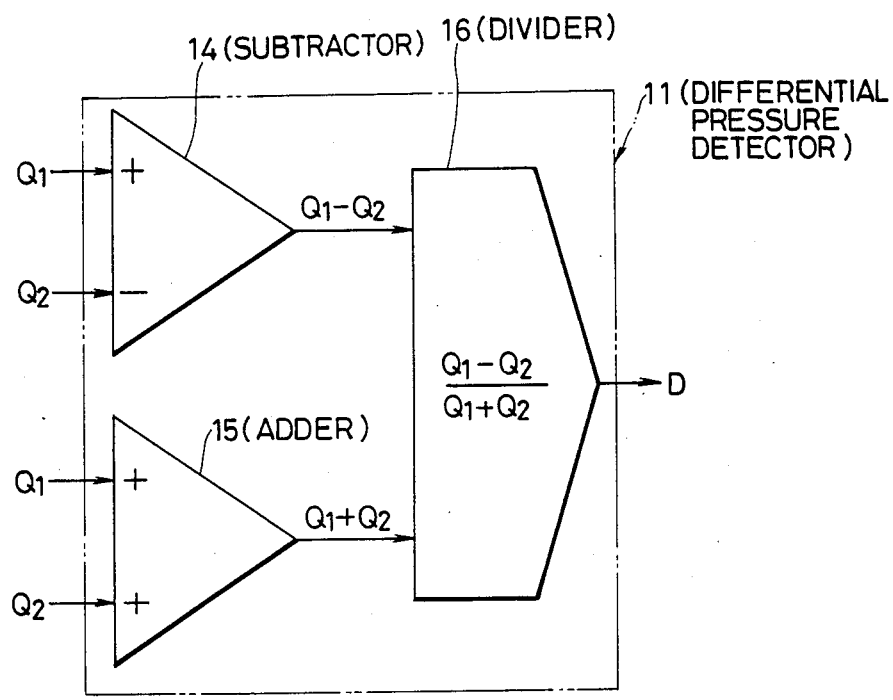
FIG. 5 is a diagram showing the arrangement of a differential pressure detector which constitutes the processor in FIG. 3.

FIG. 5 shows the example of arrangement of the differential pressure detector 11. This circuit 11 delivers the signal D proportional to the normalized difference of the signals $Q_1$ and $Q_2$ in such a way that the difference of the signals $Q_1$ and $Q_2$ calculated by a subtractor 14 is divided by the sum of the signals $Q_1$ and $Q_2$ calculated by an adder 15, by means of a divider 16. Here, this circuit 11 need not always provide the signal D which is proportional to the normalized difference of the signals $Q_1$ and $Q_2$, but it may well be arranged so as to provide a signal D which is directly proportional to the difference of the signals $Q_1$ and $Q_2$.

Figure 6:
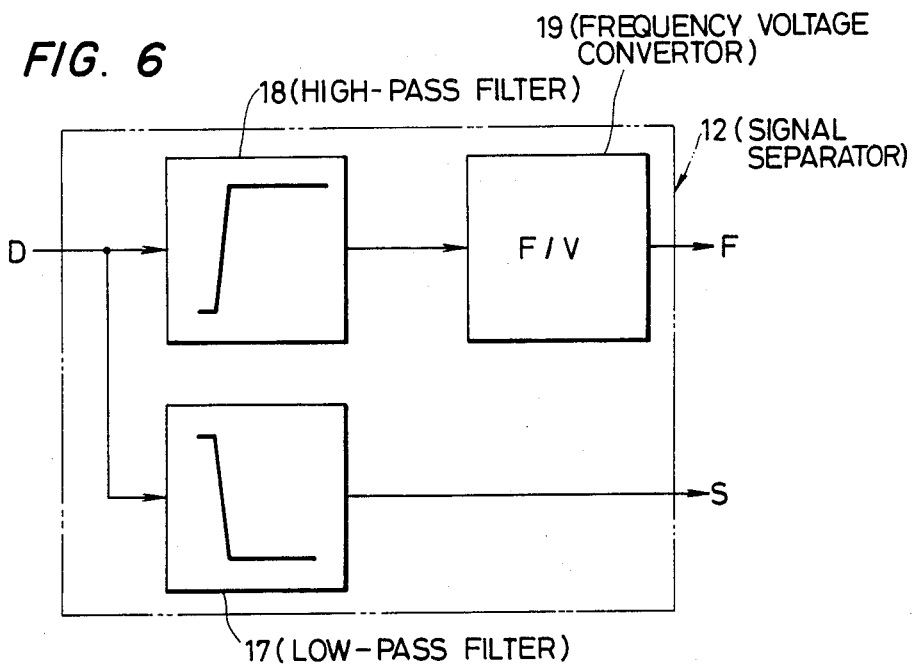
FIG. 6 is a diagram showing the arrangement of a signal separator which constitutes the processor in FIG. 3.

FIG. 6 shows the example of arrangement of the signal separator 12. In this circuit 12, a low-pass filter 17 provides the viscosity signal S proportional to the D.C. component of the signal D, a high-pass filter 18 extracts the A.C. component of the signal D, and a frequency-voltage converter 19 provides the slip signal F proportional to the frequency of the A.C. component. Here, the frequency-voltage converter 19 may well be replaced with a frequency counter or the like which produces an output corresonding to the value of the frequency, through digital processing.

There will now be described the operation of the foregoing embodiment of the sensing means of the present invention.

Information on the sense of a press acting vertically on the touch device 5, that is, the pressure sense is produced by the pressure detector 10 as the pressure signal P which is proportional to the average value of the pressures acting on the pressure sensing devices 3 and 4. Information on a sense to feel that an object to-be-handled lying in contact with the convex part 5A of the touch device 5 is going to move in the horizontal direction, that is, the viscosity sense is produced by the differential pressure detector 11 and the signal separator 12 as the viscosity signal S which is based on the difference of the pressures acting on the pressure sensing devices 3 and 4. Information on a sense to feel that the object lying in contact with the convex part 5A of the touch device 5 slips in the horizontal direction, that is, the slip sense is produced as the slip signal F which is based on the frequency of stick slip vibrations ascribable to the friction between the touch device 5 and the object.

Thus, according to this embodiment, a complex sense consisting of the pressure sense, the viscosity sense and the slip sense can be detected by the single sensing means. Moreover, since the detection portion and the processor for the signals from this detection portion are integrated and constructed on the single base, tactile sensing means easy of miniaturization for high density packaging can be constructed.

Next, other embodiments of the sensing means of the present invention will be described with reference to FIGS. 7 and 8. In these figures, parts assigned the same numerals as in FIG. 2 denote similar portions.

Figure 7:
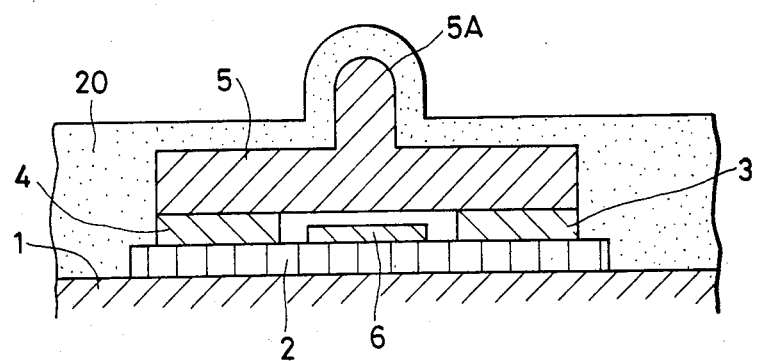
FIGS. 7-10 are vertical sectional front views each showing another embodiment of the sensing means of the present invention.

The embodiment shown in FIG. 7 is such that a protective layer 20 which is made of a flexible material having a high friction factor is formed around the detection portion.

According to this embodiment, owing to the protective layer 20, the detection portion can be protected from physical influences such as collision an friction ascribable to its contact with the object to-be-handled. Moreover, owing to the frictional force of the surface of the protective layer 20, the contact between the object and the touch device 5 is ensured, and the detection sensitivities of the viscosity sense and the slip sense can be improved.

Figure 8:
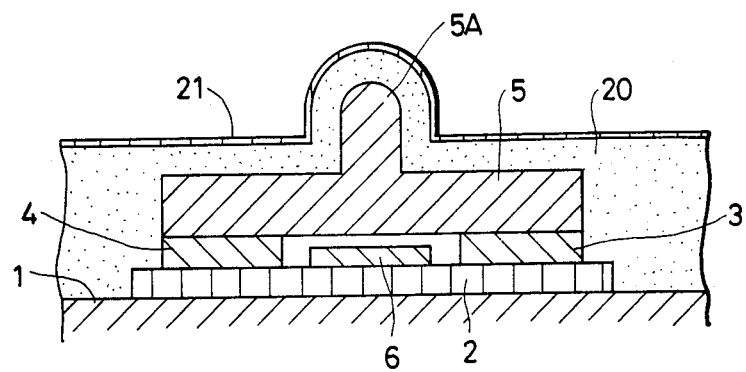

The embodiment shown in FIG. 8 is a modification of the embodiment shown in FIG. 7. In FIG. 8, parts assigned the same numerals as in FIG. 7 denote similar components. This embodiment is such that a reinforcement layer 21 which is made of a heat-resisting and wear-resisting material is formed on the surface of the protective layer 20.

According to this embodiment, owing to the reinforcement layer 21, the protective layer 20 can be protected from high heat and wear, and the lifetime and the resistance-to-environment of the tactile sensing means can be enhanced.

In this embodiment, the reinforcement layer 21 may well be formed by changing the quality of the surface of the protective layer 20 so as to enhance the heat resistance and the wear resistance.

Next, still other embodiments of the sensing means of the present invention will be described with reference to FIGS. 9 and 10. In these figures, parts assigned the same numerals as in FIG. 2 denote similar components.

Figure 9:
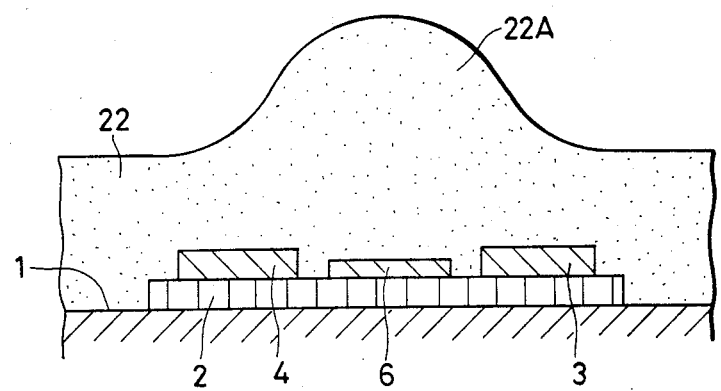

In the embodiment shown in FIG. 9, a protective layer 22 which is made of a flexible material having a high friction factor is formed on the pressure sensing devices 3 and 4, and a convex part 22A is formed in that position of the protective layer 22 which is close to the center of the arranged positions of the pressure sensing devices 3 and 4, whereby this protective layer 22 is formed as a touch device.

According to this embodiment, a force exerted on the convex part 22A is transmitted to the pressure sensing devices 3 and 4 through the elasticity of the protective layer 22. Therefore, the touch device 5 as in the embodiment shown in FIG. 1 need not be provided, and any movable part can be omitted from within the construction of the tactile sensing means, so that the fabrication is facilitated and that the reliability can be enhanced.

Figure 10:
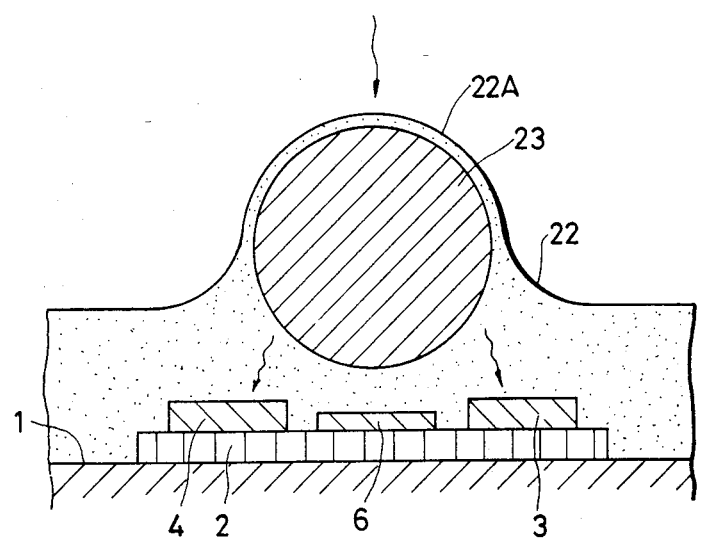

FIG. 10 shows a modification of the embodiment shown in FIG. 9. In FIG. 10, parts assigned the same numerals as in FIG. 9 denote the same portions.

In this embodiment, a touch device 23 which is made of a material of high elasticity is formed in the convex part 22A of the protective layer 22.

According to this embodiment, the transmission of a force from the convex part to the pressure sensing devices 3 and 4 is executed through the touch device of high elasticity 23, so that the sensitivity of the tactile sensing means can be reduced better than in the embodiment shown in FIG. 9.

In this embodiment, the touch device 23 may well be formed by chaning the quality of the protective layer 22 into the high elasticity.

Figure 11:
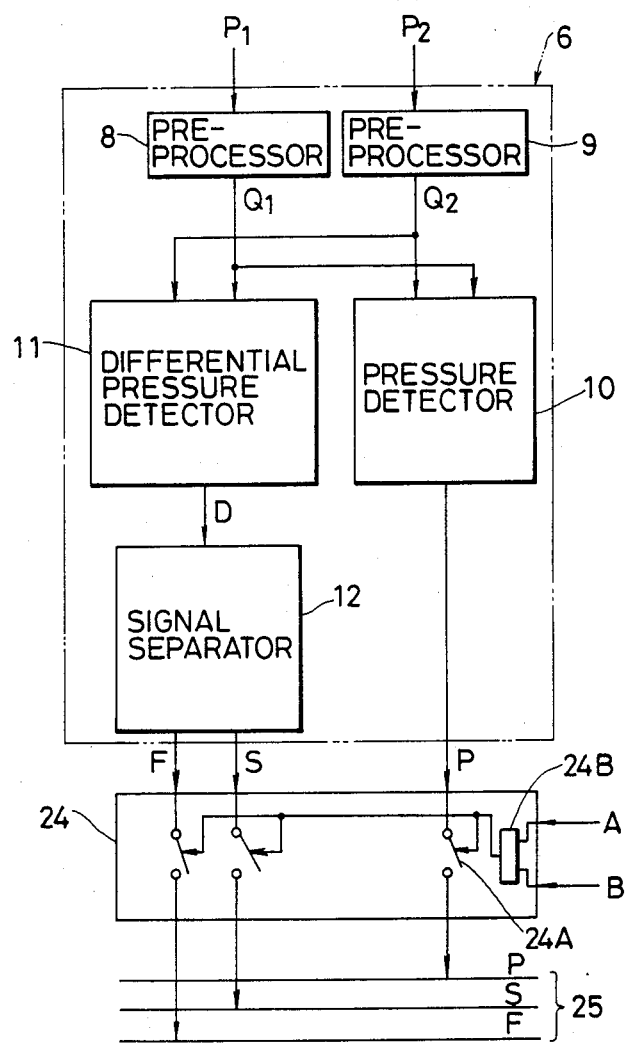
FIG. 11 is a diagram showing a circuit for transmitting signals from the processor, for use in the present invention.

FIG. 11 shows an example of arrangement of signal transmission from the processor which constitutes the present invention. In this figure, parts assigned the same numerals as in FIG. 3 denote the same portions. In the arrangement of the signal transmission, the pressure signal P, viscosity signal S and slip signal F are transmitted to a data bus 25 through a bus driver 24. The bus driver 24 comprises, for example, switches 24A and an AND circuit 24B. It operates so that the pressure signal P, viscosity signal S and slip signal F may be provided when both signals A and B have become true, and that its outputs may become high impedances when both the signals A and B do not become true.

Figure 12:
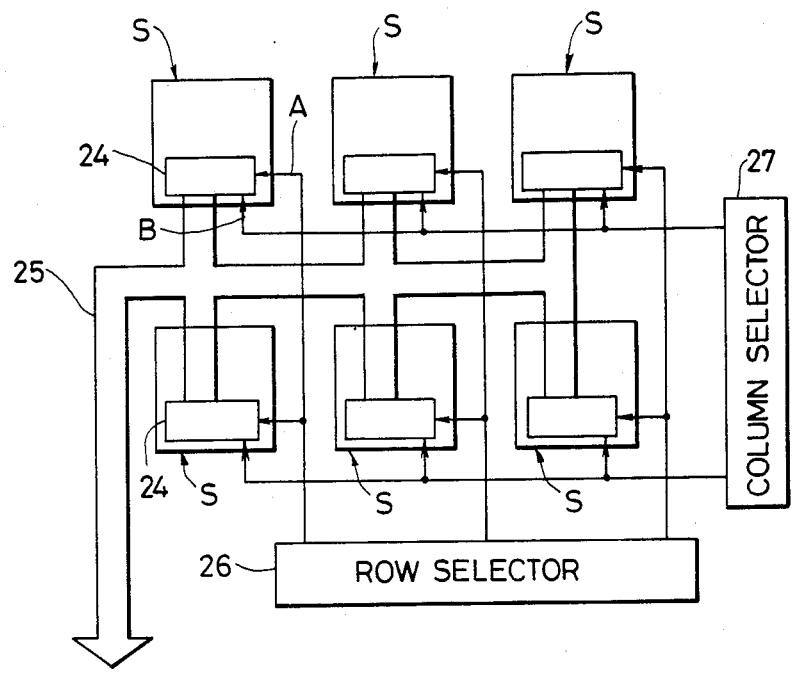
FIG. 12 is a diagram showing an example of use of the sensing means of the present invention.

FIG. 12 shows an example of use of the tactile sensing means S of the present invention each having the processor shown in FIG. 11.

The outputs of the bus drivers 24 of the plurality of tactile sensing means S arrayed in a checkered pattern are connected to the common data bus 25. The bus driver 24 of each tactile sensing means S is selected by the signals A and B which a row selector 26 and a column selector 27 generate, and it delivers the detected results to the data bus 25. That is, the detected results of the tactile sensing means S for which both the signals A and B have been appointed to be true appear on the data bus 25.

As described above, according to the embodiment illustrated in FIGS. 11 and 12, the plurality of tactile sensing means S can be arranged at a high density on a plane, to obtain the sense information of two-dimensional distributions such as pressure distribution, viscosity force distribution and slip distribution.

In these embodiments, the bus driver 24 is constructed so as to be selected by the two signals of the signals A and B. It is obvious, however, that the bus driver may well be constructed so as to be selected by one signal or three or more signals.

Next, another embodiment of the sensing means of the present invention will be described with reference to FIGS. 13 and 14.

Figure 13:
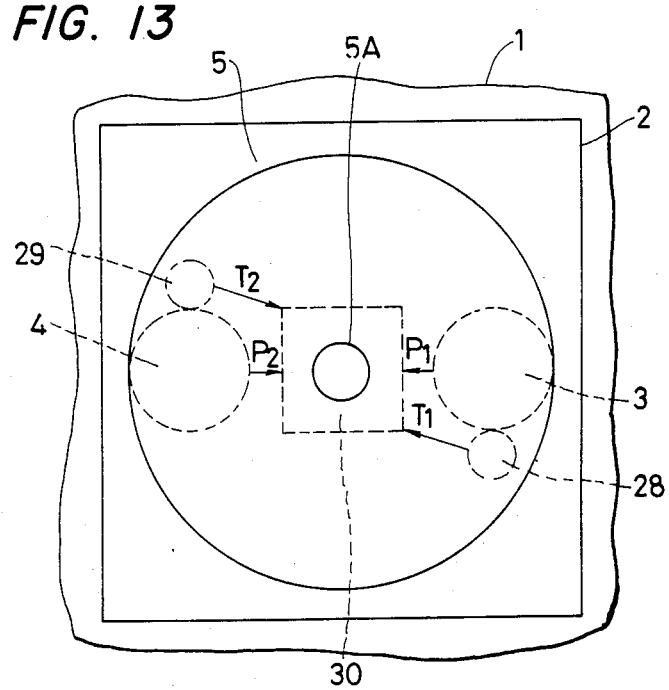
FIG. 13 is a plan view showing still another embodiment of the sensing means of the present invention.
Figure 14:
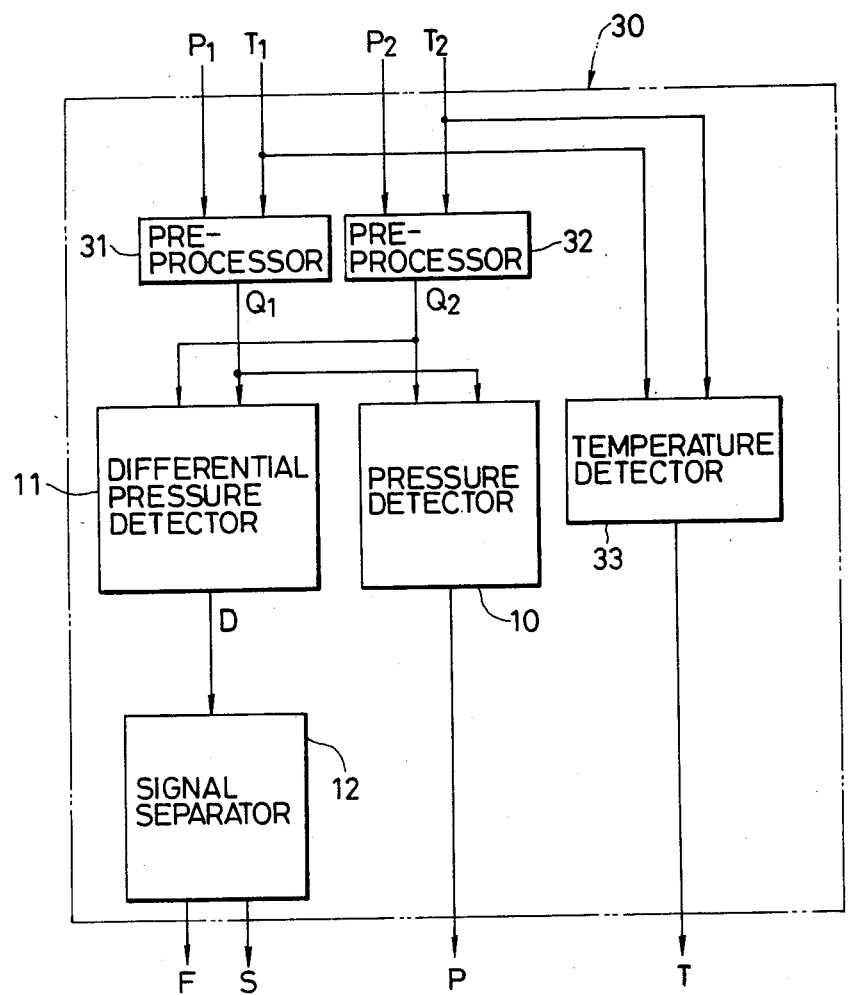
FIG. 14 is a block diagram of a processor in the embodiment of FIG. 13.

FIG. 13 is a plan view of another embodiment of the sensing means of the present invention. In this figure, parts assigned the same numerals as in FIG. 1 denote the same portions. In addition, FIG. 14 is a block diagram of a processor in the other embodiment of the sensing means of the present invention. In this figure, parts assigned the same numerals as in FIG. 3 denote the same portions. In FIG. 13, temperature sensors 28 and 29 are arranged on the base 2 in a manner to contact with the pressure sensing devices 3 and 4 respectively. The respective temperature sensors 28 and 29 supply a processor 30 with signals $T_1$ and $T_2$ which are proportional to detected temperatures. The processor 30 is provided with pre-processors 31 and 32 and a temperature detector 33. The respective pre-processors 31 and 32 compensate for the fluctuations of the signals $P_1$ and $P_2$ attributed to temperatures on the basis of the signals $T_1$ and $T_2$, and provide the signals $Q_1$ and $Q_2$ proportional to the pressures acting on the pressure sensing devices 3 and 4. The temperature detector 33 provides a temperature T which is proportional to the average value of the signal $T_1$ and the signal $T_2$.

According to this embodiment, the stabilities of the detection outputs of the tactile sensing means against temperatures can be enhanced. Further, it is possible to provide the tactile sensing means which can detect the information on the temperature, besides the pressure sense, viscosity sense and slip sense.

Next, still another embodiment of the sensing means of the present invention will be described with reference to FIGS. 15 and 16.

Figure 15:
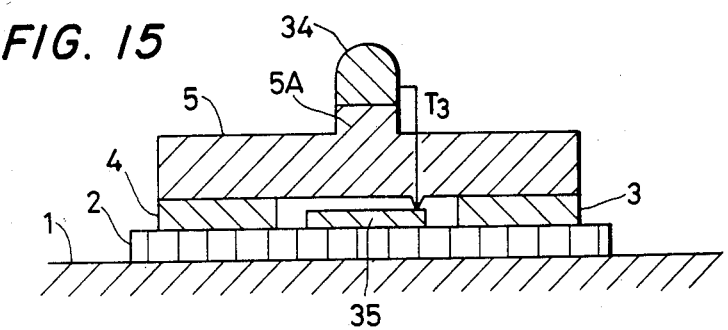
FIG. 15 is a vertical sectional front view showing another embodiment of the sensing means of the present invention.
Figure 16:
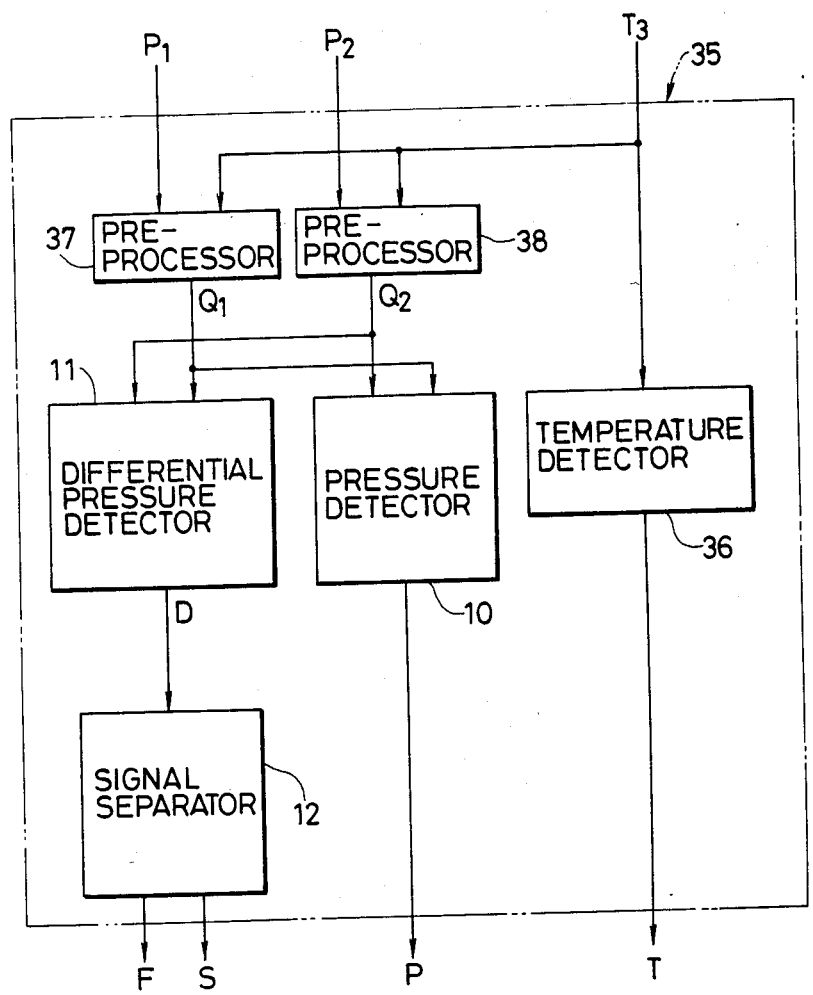
FIG. 16 is a diagram showing the arrangement of a processor which is used in the embodiment shown in FIG. 15.

FIG. 15 is a vertical sectional front view of still another embodiment of the sensing means of the present invention. In this figure, parts assigned the same numerals as in FIG. 2 denote similar portions. In addition, FIG. 16 is a block diagram of the processor of the embodiment. In this figure, parts assigned the same numerals as in FIG. 3 denote similar portions. In FIG. 15, a temperature sensor 34 is mounted on the convex part 5A of the touch device 5. The temperature sensor 34 supplies a processor 35 with a signal $T_3$ which is proportional to the temperature of the object to-be-handled lying in contact with the touch device 5. This processor 35 is provided with a temperature detector 36 and pre-processors 37 and 38. The temperature detector 36 delivers the signal T which is proportional to the signal $T_3$. The respective pre-processors 37 and 38 compensate for the fluctuations of the signals $P_1$ and $P_2$ attributed to temperatures on the basis of the signal $T_3$, and provide the signals $Q_1$ and $Q_2$ which are proportional to the pressures acting on the pressure sensing devices 3 and 4.

According to this embodiment, the stabilities of the detection outputs of the tactile sensing means against temperatures can be enhanced. Further, since the temperature sensor is arranged so as to lie in contact with the object, it is possible to provide the tactile sensing means which can produce temperature sense information more precise than in the embodiment shown in FIGS. 13 and 14.

Next, another embodiment of the sensing means of the present invention will be described with reference to FIGS. 17 to 20.

Figure 17:
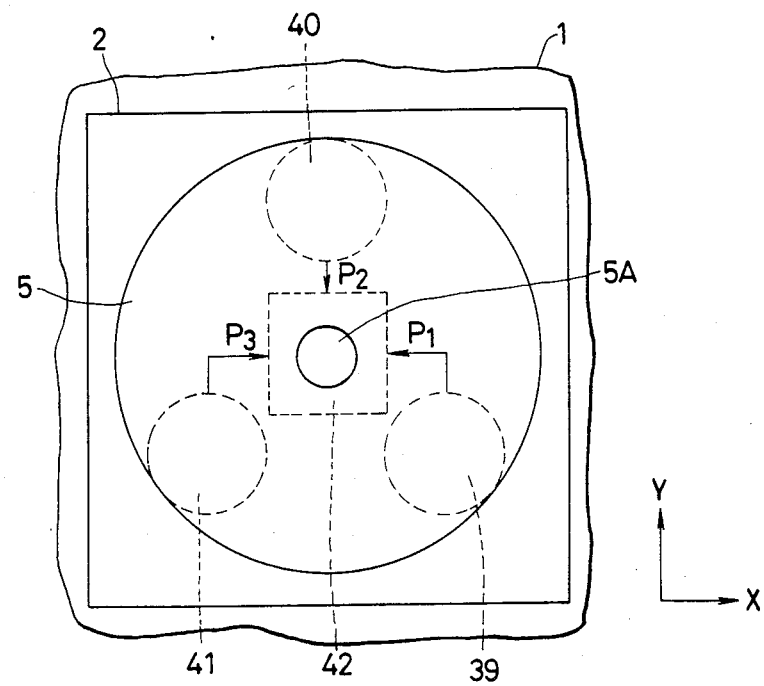
FIG. 17 is a plan view showing still another embodiment of the sensing means of the present invention.

FIG. 17 is a plan view of the other embodiment, in which parts assigned the same numerals as in FIG. 1 denote identical portions. In FIG. 17, the detection portion is so constructed that pressure sensing devices 39 and 41 are arranged in the X direction on the base 2, while a pressure sensing device 40 is arranged in a position which is spaced in the Y direction from the intermediate position of the positions of the pressure sensing devices 39 and 41, that the touch device 5 are arranged over the pressure sensing devices 39, 40 and 41 in contact therewith, and that a processor 42 is disposed on the base 2 centrally of the pressure sensing devices 39–41. The respective pressure sensing devices 39, 40 and 41 supply the processor 42 arranged on the base 2, with signals $P_1$, $P_2$ and $P_3$ which are proportional to pressures acting thereon.

Owing to the above construction, when a force acts on the convex part 5A of the touch device 5 in the vertical direction, a uniform pressure is applied to the pressure sensing devices 39, 40 and 41, and the signals $P_1$, $P_2$ and $P_3$ of equal values are provided. In addition, when a force acts on the convex part 5A in the X direction, a non-uniform pressure is applied to the pressure sensing devices 39 and 41, and a difference develops between the signal $P_1$ and the signal $P_2$. Besides, when a force in the Y direction acts on the convex part 5A, a pressure on the pressure sensing device 40 and the average value of pressures on the pressure sensing devices 39 and 41 become unequal, and a difference develops between the signal P₂ and the average value of the signals P₁ and P₃.

The arrangement of the foregoing processor 42 will be described with reference to FIG. 18.

The signals P₁, P₂ and P₃ produced by the detection portion are respectively converted into signals Q, Q₂ and Q₃ proportional thereto by pre-processors 43, 44 and 45. A pressure detector 46 calculates the average value of the signals Q₁, Q₂ and Q₃, and delivers it as the pressure signal P. A differential pressure detector 47 calculates and delivers a signal $D_x$ based on the difference of the signals Q₁ and Q₃ and a signal $D_y$ based on the difference of the signal Q₂ and the average value of the signals Q₁ and Q₃. Signal separators 48 and 49 are similar in arrangement to the signal separator 12 shown in FIG. 3, and they provide a viscosity signal $S_x$ and a slip signal $F_x$, and a viscosity signal $S_y$ and a slip signal $F_y$ on the basis of the signals $D_x$ and $D_y$.

The constituent circuits of the aforementioned processor 42 will be described with reference to FIGS. 19 and 20.

Figure 19:
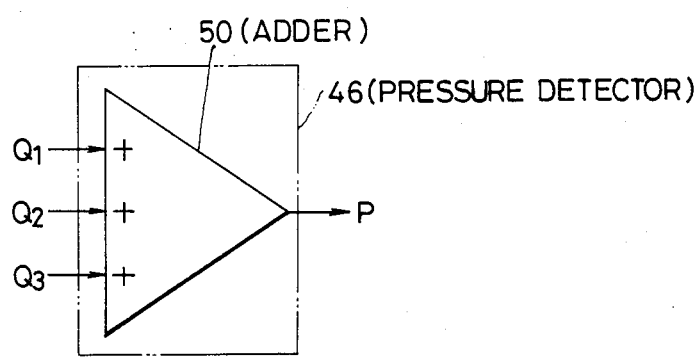
FIG. 19 is a diagram of the arrangement of a pressure detector which constitutes the processor in FIG. 18.

FIG. 19 shows the arrangement of the pressure detector 46, which is composed of an adder 50 and which delivers the pressure signal P proportional to the sum of the signals Q₁, Q₂ and Q₃.

Figure 20:
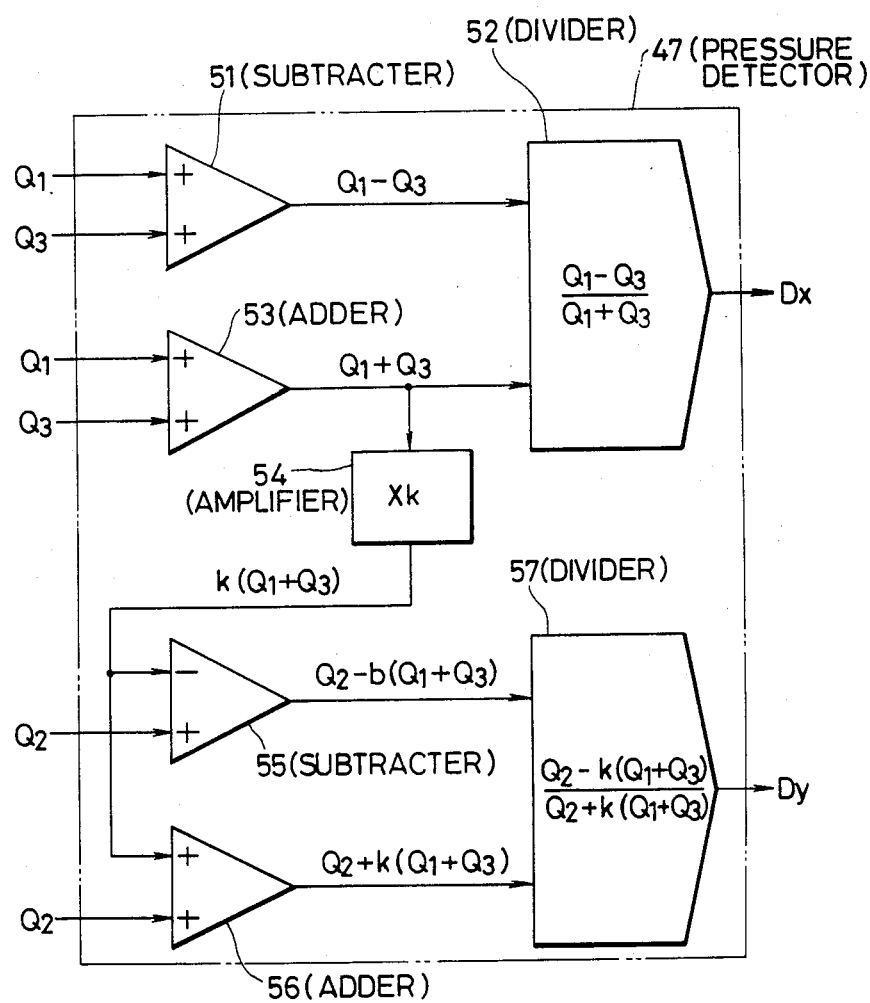
FIG. 20 is a block diagram of a differential pressure detector which constitutes the processor in FIG. 18.

FIG. 20 shows the arrangement of the differential pressure detector 47. This detector delivers the signal $D_x$ proportional to the normalized difference of the signals Q₁ and Q₂ in such a way that the difference of the signals Q₁ and Q₃ calculated by a subtractor 51 is divided by the sum of the signals Q₁ and Q₂ calculated by an adder 53, by means of a divider 52. Besides, the sum of the signals Q₁ and Q₂ delivered by the adder 53 is multiplied by k (k ≧0) by means of an amplifier 54, and is then applied to a subtractor 55 and an adder 56. The difference between the signal Q₂ and the output of the amplifier 54 as calculated by the subtractor 55 is divided by the sum between the signal Q₂ and the output of the amplifier 54 as calculated by the adder 56, by means of a divider 57, thereby to obtain the signal $D_y$ which is proportional to the normalized difference between the signal Q₂ and the average value of the signals Q₁ and Q₃. Here, the signals $D_x$ and $D_y$ need not always be those subjected to the normalization processing. Therefore, the differential pressure detector 47 may well be arranged so as to deliver the signal $D_x$ proportional to the difference between the signals Q₁ and Q₃ and to deliver the signal $D_y$ proportional to the difference between the signal Q₂ and the average value of the signals Q₁ and Q₃.

As described above, according to this embodiment, it is possible to detect, besides the pressure sense, the viscosity senses and slip senses in the X and Y directions by the use of the single sensing means. This makes it possible to construct the tactile sensing means capable of detecting information on the motions of the object in the two-dimensional directions.

Next, another example of the processor 42 for use in the embodiment illustrated in FIG. 17 will be described.

Figure 18:
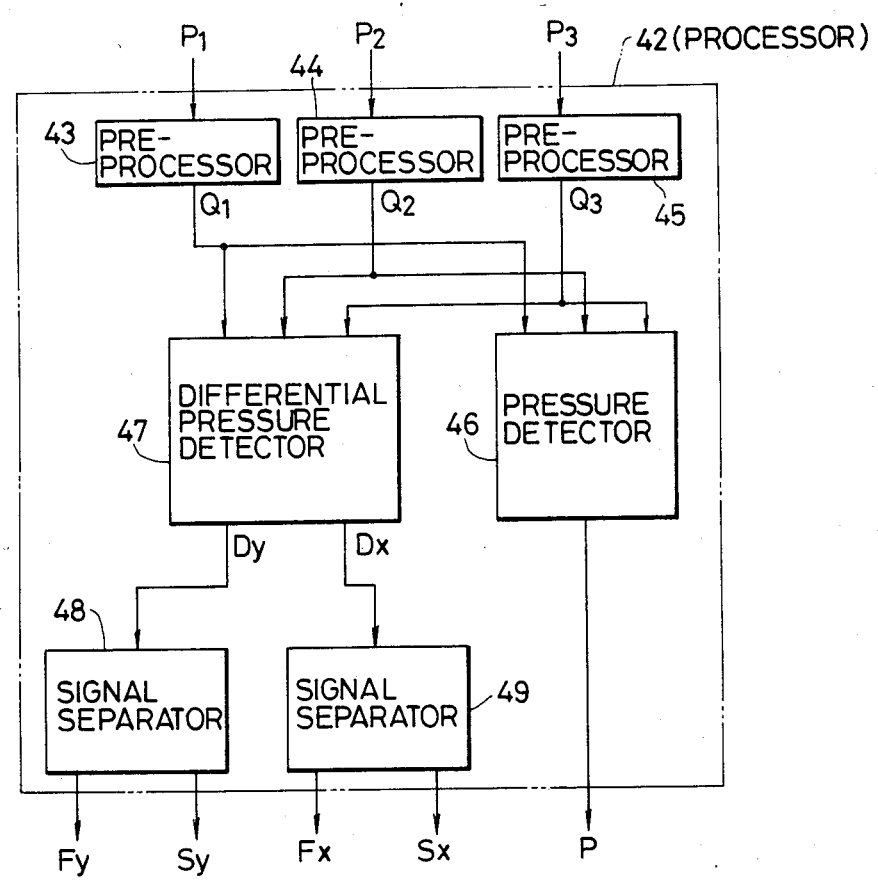
FIG. 18 is a block diagram of a processor in the embodiment of FIG. 17.
Figure 21:
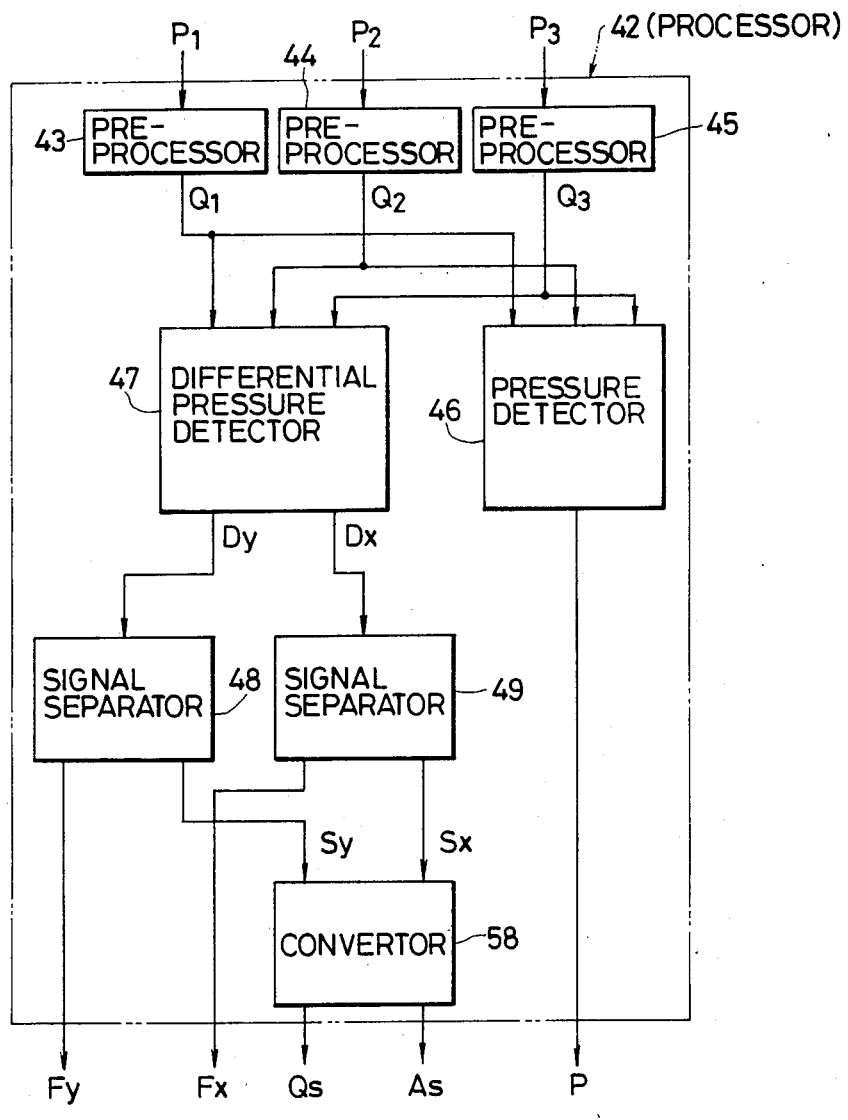
FIG. 21 is a diagram showing another example of the processor which is used in the sensing means of the present invention shown in FIG. 17.
Figure 22:
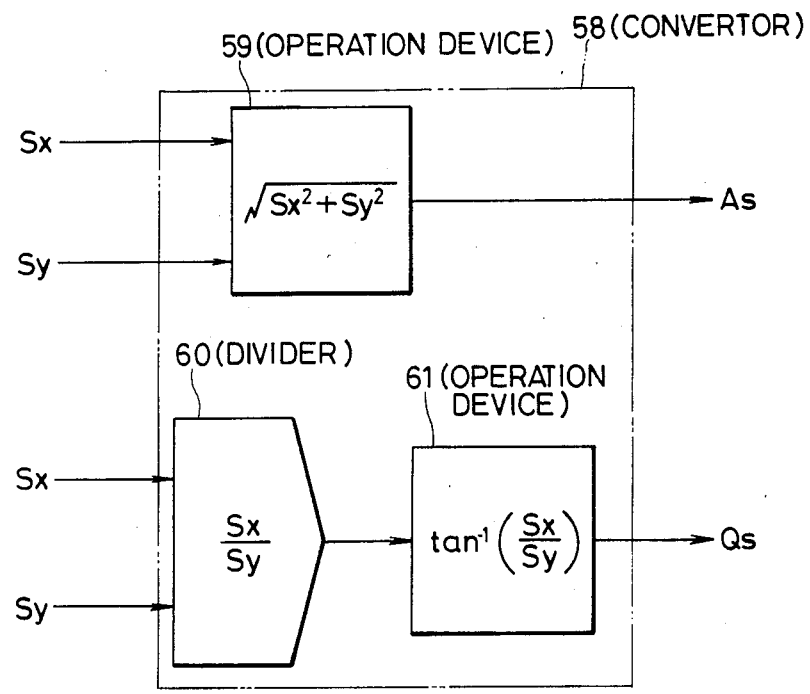
FIG. 22 is a block diagram of a converter which constitutes the processor shown in FIG. 21.

FIG. 21 shows another example of the processor 42, in which parts assigned the same numerals as in FIG. 18 denote identical portions. In FIG. 21, a converter 58 calculates and delivers a viscosity intensity signal $A_s$ proportional to the intensity of a viscosity force and a viscosity direction signal $Q_s$ proportional to the direction of the viscosity force within the X-Y plane, on the basis of the viscosity signal $S_x$ and the viscosity signal $S_y$. An example of arrangement of this converter 58 is shown in FIG. 22. An operation device 59 calculates and delivers the viscosity intensity signal $A_s$ which is proportional to the root-mean-square value of the viscosity signals $S_x$ and $S_y$. Besides, a divider 60 calculates the ratio $S_x/S_y$ between the viscosity signals $S_x$ and $S_y$, whereupon an operation device 61 calculates and delivers the viscosity direction signal $Q_s$ proportional to the directional angle of the viscosity force within the X-Y plane on the basis of Equation (1):

$$Q_s = A \tan^{-1}(S_x/S_y) \qquad (1)$$

In the arrangement of the processor 42, the operation device 41 may well be constructed so as to be capable of operating all the directions within the X-Y plane on the basis of the minus sign of the viscosity signal $S_x$ and $S_y$.

As stated above, according to the arrangement of the processor 42, it is possible to provide the tactile sensing means which can obtain the information on the viscosity sense in the form of the intensity of the viscosity force and the direction thereof within the X-Y plane.

Figure 23:
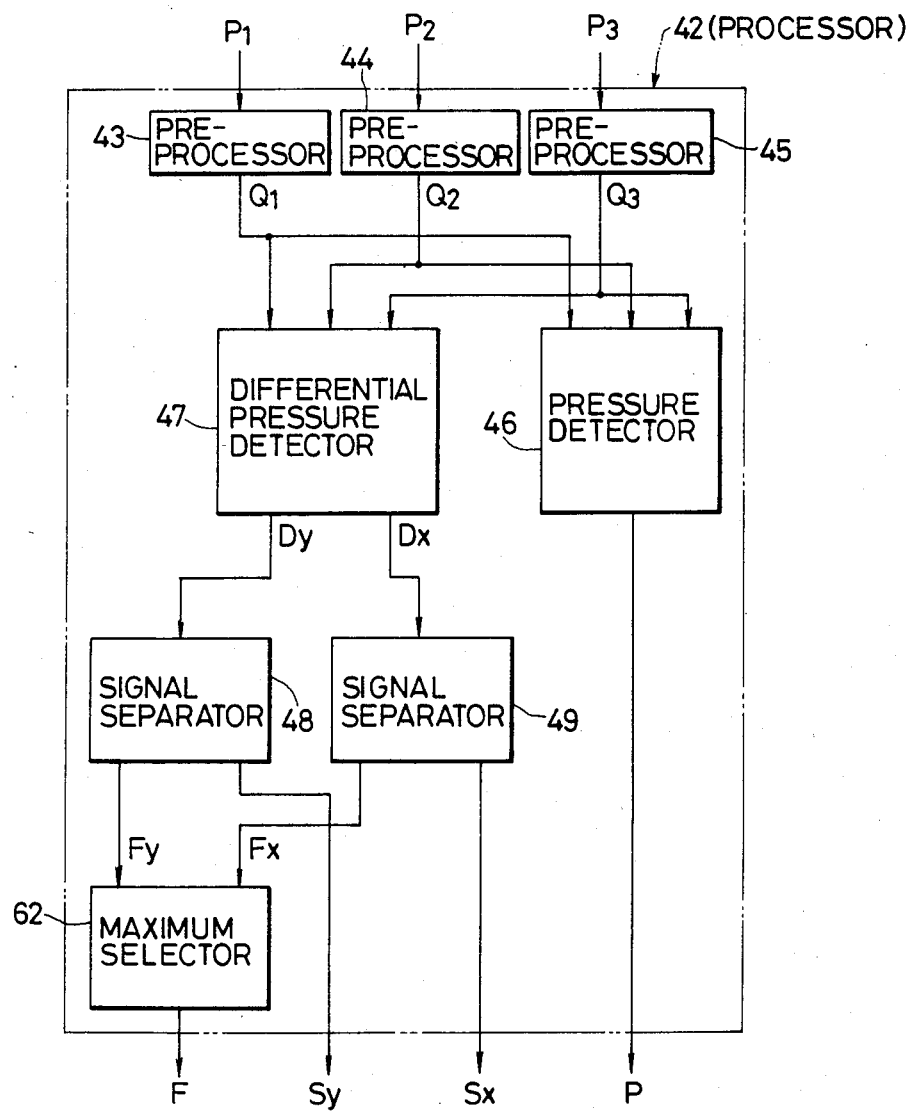
FIG. 23 is a diagram showing still another example of the processor which is used in the sensing means of the present invention shown in FIG. 17.

Further, still another example of the processor 42 for use in the embodiment of FIG. 17 will be described with reference to FIG. 23. In this figure, parts assigned the same numerals as in FIG. 18 denote identical portions.

This processor 42 comprises a maximum selector 62. This circuit 62 delivers one of a larger value between the slip signals $F_x$ and $F_y$, as the slip signal F.

According to the arrangement of this processor 42, it is possible to provide the tactile sensing means which can preferentially deliver an accurate value as the slip signal F in a case where the value of either the signal $D_y$ or the signal $D_x$ is very small or where either the slip signal $F_x$ or the slip signal $F_y$ exhibits an inaccurate value.

There will now be described still another embodiment of the sensing means of the present invention.

Figure 24:
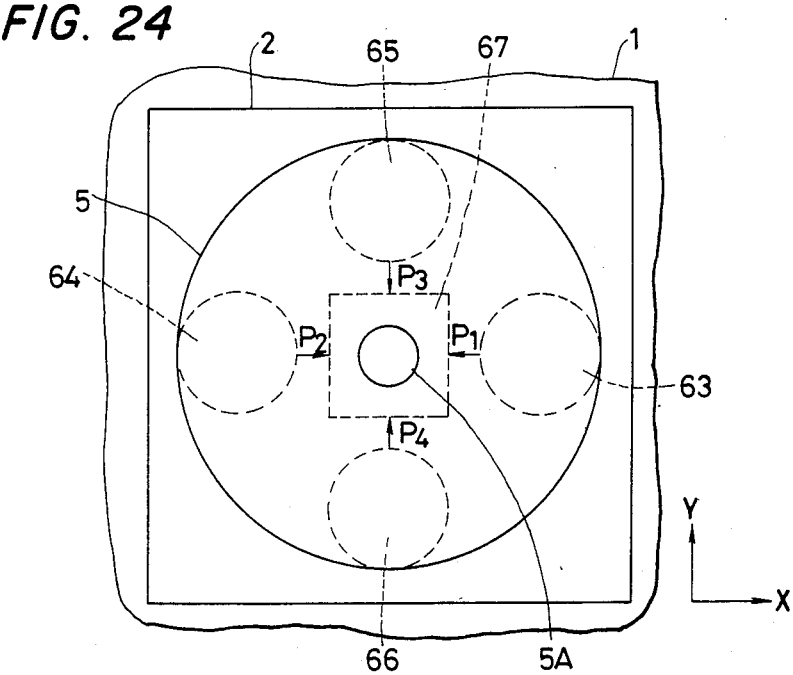
FIG. 24 is a plan view showing still another embodiment of the sensing means of the present invention.

FIG. 24 is a plan view of still another embodiment of the sensing means of the present invention, in which parts assigned the same numerals as in FIG. 1 denote similar portions. In FIG. 24, the detection portion is so constructed that pressure sensing devices 63 and 64 are arranged on the base 2 in a manner to be arrayed in the X direction, while pressure sensing devices 65 and 66 are arranged in a manner to be arrayed in the Y direction, that the touch device 5 is arranged over the pressure sensing devices 63, 64, 65 and 66 in contact therewith, and that a processor 67 is disposed on the base 2 centrally of these pressure sensing devices 63–66. The respective pressure sensing devices 63, 64, 65 and 66 supply the processor 67 arranged on the base 2, with signals P₁, P₂, P₃ and P₄ which are proportional to pressures exerted thereon.

Owing t the above construction, when a force acts on the convex part 5A of the touch device 5 in the vertical direction, a uniform pressure is applied to the pressure sensing devices 63, 64, 65 and 66, and the signals P₁, P₂, P₃ and P₄ of equal values are delivered. Besides, when a force acts on the convex part 5A in the X direction, a non-uniform pressure is applied to the pressure sensing devices 63 and 64, so that a difference arises between the signal P₁ and the signal P₂. When a force acts on the convex part 5A in the Y direction, a non-uniform pressure is applied to the pressure sensing devices 65 and 66, so that a difference arises between the signals P₃ and P₄.

Figure 25:
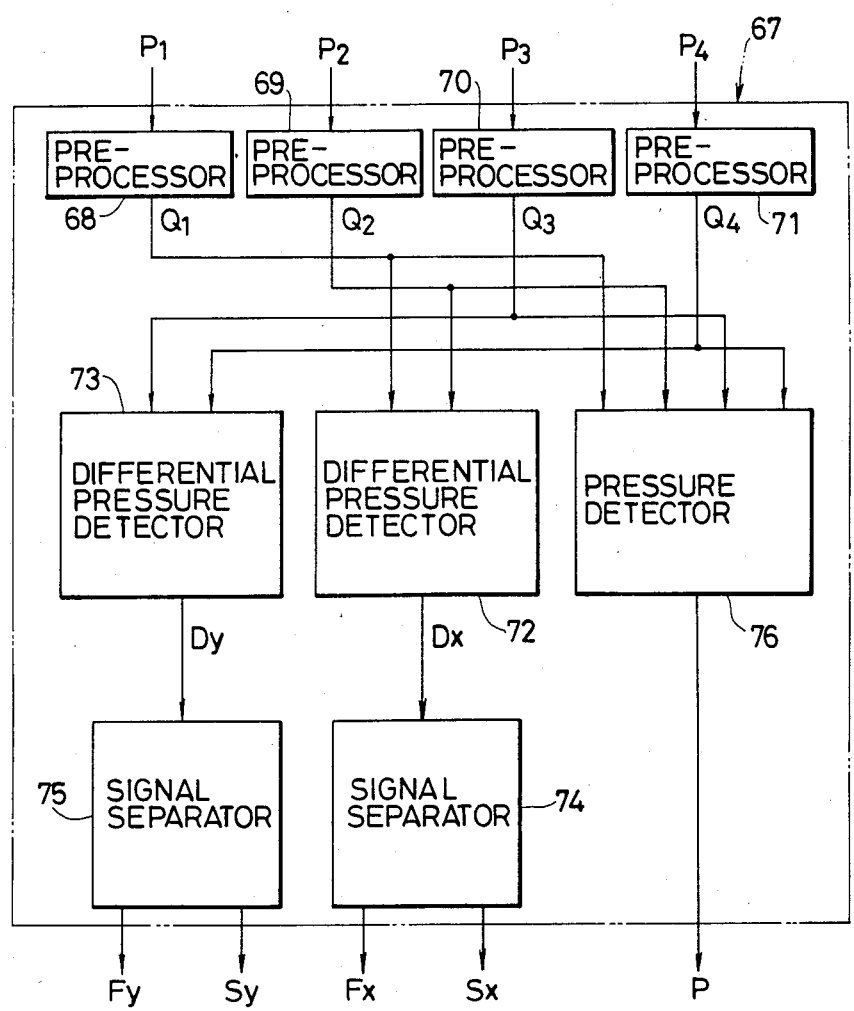
FIG. 25 is a block diagram of a processor which constitutes the sensing means in FIG. 24.
Figure 26:
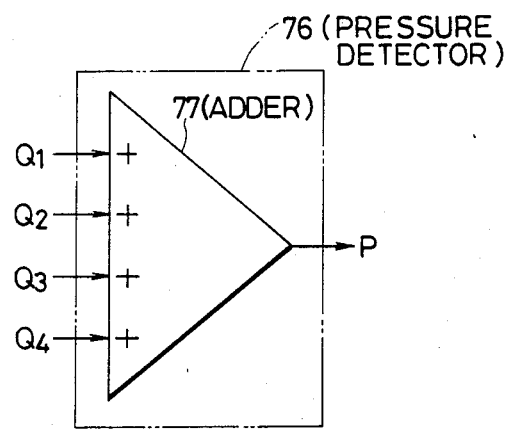
FIG. 26 is a diagram of the arrangement of a pressure detector which constitutes the processor shown in FIG. 25.

The arrangement of the aforementioned processor 67 will be described with reference to FIG. 25. The signals $P_1$, $P_2$, $P_3$ and $P_4$ produced by the detection portion are converted into signals $Q_1$, $Q_2$, $Q_3$ and $Q_4$ proportional thereto by pre-processors 68, 69, 70 and 71, respectively. Differential pressure detectors 72 and 73 are similar in arrangement to the differential detector 11 shown in FIG. 3, and they deliver a signal $D_x$ on the basis of the signals $Q_1$ and $Q_2$ and a signal $D_y$ on the basis of the signals $Q_3$ and $Q_4$, respectively. Signal separators 74 and 75 are similar in arrangement to the signal separator 12 shown in FIG. 3, and they deliver a viscosity signal $S_x$ and a slip signal $F_x$ on the basis of the signal $D_x$ and a viscosity signal $S_y$ and a slip signal $F_y$ on the basis of the signal $D_y$, respectively. A pressure detector 76 is composed of an adder 77 as shown in FIG. 26, and it produces a pressure signal P proportional to the average value of the signals $Q_1$, $Q_2$, $Q_3$ and $Q_4$.

As stated above, according to this embodiment, the pressure sensing devices 63 and 64 are arrayed in the X direction, and those 65 and 66 are arrayed in the Y direction. Accordingly, the information items of the forces in the X and Y directions can be separated at the output stage of the pressure sensing devices. It is therefore possible to provide the tactile sensing means in which the detection precisions of the viscosity signals $S_x$ and $S_y$ and the slip signals $F_x$ and $F_y$ are higher than in the embodiment illustrated in FIGS. 17 and 18.

In one embodiment and the other embodiments described above, it is to be understood that the processor may be constructed of an analog circuit, a digital circuit, a hybrid circuit of analog and digital circuits, or software with a microcomputer or the like.

As described above, according to the present invention, a pressure sense, a viscosity sense and a slip sense can be simultaneously detected from the relations among the outputs of a plurality of pressure sensing devices, and a processor for processing the outputs of the pressure sensing devices is integrated and is packaged in the sensing means proper, so that the tactile sensing means which affords a complex sense and which permits high density packaging can be constructed. Moreover, when packaged at a high density on a plane, the tactile sensing means of the present invention make it possible to grasp information on the pressure sense, viscosity sense and slip sense as plane distributions, like the skin sensation of man, and they can realize a robot capable of a complicated and deft handwork which has hitherto been unattainable.

What is claimed is:

1. A tactile sensing apparatus for detecting a tactile sense with an object to-be-handled comprising a base, detection means including a plurlaity of pressure sensing devices arranged on said base, and a touch device having a member including a convex part mounted at a central portion thereof for distributing and applying a force to said plurality of pressure sensing devices, and processor means connected to said plurality of pressure sensing devices for processing outputs of said plurality of pressure sensing devices, said detection means and said processor means being arranged on the same base, and a protective layer made of a flexible material being formed around said detection means, wherein said processor means forms information based on an average value of outputs of said plurality of pressure sensing devices and in a D.C. component and an A.C. component of a difference of outputs of said plurality of pressure sensing devices.

2. Tactile sensing apparatus as defined in claim 1, wherein said processor means can change-over its output terminals into high impedance states in accordance with external signals.

3. Tactile sensing apparatus as defined in claim 1, wherein said processor means performs temperature compensations of outputs of said pressure sensing devices on the basis of an output of at least one temperature sensor which is arranged on said base.

4. A tactile sensing apparatus for detecting a tactile sense with an object to-be-handled comprising a base, detection means including three pressure sensing devices arranged on said base, and a touch device having a member including a convex part mounted at a central portion thereof for distributing and applying a force to said three pressure sensing devices, and processor means connected to said three pressure sensing devices for processing outputs of said three pressure sensing devices, said detection means and said processor means being arranged on the same base, and a protective layer made of a flexible material being formed around said detection means, wherein said processor means is constructed so as to form information based on an average value of outputs of said three pressure sensing devices arranged at three points not arrayed on an identical straight line, on a D.C. component and an A.C. component of a difference between an output of one of said three pressure sensing devices and an average value of the other two outputs, and on a D.C. component and an A.C. component of a difference between said other two outputs.

5. Tactile sensing apparatus as defined in claim 4, wherein said processor means can change-over its output terminals into high impedance states in accordance with external signals.

6. Tactile sensing apparatus as defined in claim 4, wherein said processor means performs temperature compensations of outputs of said pressure sensing devices on the basis of an output of at least one temperature sensor which is arranged on said base.

7. A tactile sensing apparatus for detecting a tactile sense with an object to-be-handled comprising a base, detection means including four pressure sensing devices arranged on said base, and a touch device having a member including a convex part mounted at a central portion thereof for distributing and applying a force to said four pressure sensing devices, and processor means connected to said four pressure sensing devices for processing outputs of said four pressure sensing devices, said detection means and said processor means being arranged on the same base, and a protective layer made of a flexible material being formed around said detection means, wherein said processor means forms information based on D.C. components and A.C. components of differences between a respective two pressure sensing devices of two pressure sensing devices arranged on one of orthogonally intersecting straight lines and two other pressure sensing devices arranged on the other straight line, a D.C. component and an A.C. component of the difference between the outputs of said two other pressure sensing devices, and an average value of the outputs of said four pressure sensing devices.

8. Tactile sensing apparatus as defined in claim 7, wherein said processor means can change-over its output terminals into high impedance states in accordance with external signals.

9. Tactile sensing apparatus as defined in claim 7, wherein said processor means performs temperature compensations of outputs of said pressure sensing devices on the basis of an output of at least one temperature sensor which is arranged on said base.

10. Tactile apparatus sensing apparatus as defined in any one of claims 1–7, wherein a reinforcement layer made of a heat-resisting and wear-resisting material is formed on a surface of said protective layer.

11. Tactile sensing apparatus as defined in any one of claims 1–7, wherein said touch device is constructed of said protective layer formed with the convex part.

12. Tactile sensing apparatus as defined in claim 11, wherein a material of high elasticity is arranged in said convex part of said protective layer.

* * * * *